United States Patent
Bloomstein

(10) Patent No.: US 8,359,491 B1
(45) Date of Patent: Jan. 22, 2013

(54) DISASTER RECOVERY REHEARSAL USING COPY ON WRITE

(75) Inventor: Jason R. Bloomstein, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1870 days.

(21) Appl. No.: 11/060,129

(22) Filed: Feb. 17, 2005

Related U.S. Application Data

(60) Provisional application No. 60/557,371, filed on Mar. 30, 2004.

(51) Int. Cl.
*G06F 11/00* (2006.01)
(52) U.S. Cl. .................................................. 714/6.3
(58) Field of Classification Search ............... 714/1–57, 714/6.3
See application file for complete search history.

(56) References Cited

U.S. PATENT DOCUMENTS

| | | | |
|---|---|---|---|
| 5,673,382 A | 9/1997 | Cannon et al. | |
| 5,835,953 A | 11/1998 | Ohran | |
| 5,845,295 A * | 12/1998 | Houseman et al. | 707/204 |
| 6,304,882 B1 * | 10/2001 | Strellis et al. | 707/202 |
| 6,732,294 B2 | 5/2004 | Mackrory et al. | |
| 6,981,177 B2 | 12/2005 | Beattie | |
| 7,013,372 B2 | 3/2006 | Achiwa et al. | |
| 7,149,858 B1 * | 12/2006 | Kiselev | 711/162 |
| 2004/0139128 A1 * | 7/2004 | Becker et al. | 707/204 |
| 2005/0010588 A1 * | 1/2005 | Zalewski et al. | 707/102 |

* cited by examiner

*Primary Examiner* — Scott Baderman
*Assistant Examiner* — Jigar Patel
(74) *Attorney, Agent, or Firm* — Meyertons Hood Kivlin Kowert & Goetzel, P.C.; Jeffrey C. Hood

(57) ABSTRACT

A system for disaster recovery rehearsals using copy-on-write may include a data set of an application and a disaster recovery manager. The disaster recovery manager may be configured to perform a disaster recovery rehearsal using a copy-on-write snapshot of the data set.

17 Claims, 7 Drawing Sheets

Computer Accessible Medium 600

Disaster Recovery Software 610

FIG. 6

DISASTER RECOVERY REHEARSAL USING COPY ON WRITE

This application claims the benefit of U.S. Provisional Application No. 60/557,371 entitled "Using Copy On Write For Disaster Recovery Rehearsal", filed Mar. 30, 2004.

BACKGROUND OF THE INVENTION

1. Field of the Invention

This invention relates to computer systems and, more particularly, to disaster recovery of computer systems.

2. Description of the Related Art

Many business organizations and governmental entities today increasingly rely upon mission-critical applications to provide services to both internal and external customers. Large data centers in such organizations may support complex mission-critical applications utilizing hundreds of processors and terabytes of data. Application down time, e.g., due to hardware or software failures, bugs, malicious intruders, or events such as power outages or natural disasters, may sometimes result in substantial revenue losses and/or loss of good will among customers in such environments. The importance of maintaining a high level of application availability has therefore been increasing over time.

Various approaches may be taken to increase the availability of the computing services provided at a data center, such as the use of redundant and/or fault-tolerant hardware and software, the deployment of security software and/or hardware such as anti-virus programs, firewalls and the like, extensive debugging of software prior to deployment in a production environment, etc. However, it may be hard or impossible to completely eliminate the occurrence of certain types of events at a given site, such as earthquakes, floods, fires, tornadoes, large-scale power outages, or terrorist attacks, any of which may lead to substantial application down time. In order to be able to respond to such situations effectively, enterprises often choose to implement disaster recovery techniques of various kinds.

A typical disaster recovery technique may include replicating the data of a production application at a physically remote site from the primary data center where the production application is running. Such remote replication may be motivated by the consideration that, in the event that a disaster at the primary data center were to occur, a second instance or copy of the production application may be started, and such a second instance may continue providing the desired services using the replica of the production application data. Updates to the production application data may often be replicated as soon as they occur at the primary data center; that is, the replica of the production data may be kept synchronized, or close to synchronized, with the production version of the data. This replication may be fairly expensive in itself, because the remote site must typically maintain at least as much storage space as is being used at the primary data center. For example, if the production application data requires X terabytes of storage, an additional X terabytes of storage may be needed to replicate the production application data at the remote site.

However, even replicating the entire production data set at the remote site may be insufficient to ensure effective and reliable disaster recovery for complex applications. Mission-critical applications may require non-trivial configuration or setup steps, and may rely upon numerous software packages with frequently changing versions. Simply maintaining a replica of the application data, without exercising the application in combination with the replicated data from time to time to ensure that it operates correctly, may not result in the desired level of confidence that application recovery would actually succeed in the event of a disaster. In order to exercise the application, disaster recovery rehearsals may be performed from time to time. To simulate disaster conditions as closely as possible, and to ensure that the production data replication continues while a disaster recovery rehearsal is performed, a second replica of the production application data may therefore have to be maintained at the remote site for use during disaster recovery rehearsals. Updates performed at the primary data site may continue to be replicated at the first replica, so that the first replica remains current with respect to the production application data. The second replica, used for disaster recovery rehearsal, may be a fixed or point-in-time copy of the first replica. Creating such a second replica may greatly increase the expense involved in disaster recovery: for example, if the production application data requires X terabytes of storage, X terabytes of storage may be needed for the first replica, and an additional X terabytes of data may be needed for the replica used for disaster recovery rehearsals. Especially for applications with large data sets, storage costs associated with disaster recovery rehearsals may therefore become prohibitive.

SUMMARY

Various embodiments of a system and method for disaster recovery rehearsals using copy-on-write are disclosed. According to a first embodiment, a system may include a data set of an application and a disaster recovery manager. The disaster recovery manager may be configured to perform a disaster recovery rehearsal using a copy-on-write snapshot of the data set. A smaller amount of storage space may be dedicated to the copy-on-write snapshot than may be required to store a full copy of the application's data set. The disaster recovery rehearsal may include various steps that may be performed in order to validate whether a recovery version of the application would be able to support services normally provided by the application in the event of an extended application outage, e.g., an outage caused by a natural disaster such as an earthquake, fire or flood. Such steps may include setting up one or more storage devices for use by the recovery version of the application, starting up the recovery version of the application, running one or more tests to verify correct operation of the recovery version of the operation, etc. In some embodiments, the disaster recovery manager may be configured to establish the copy-on-write snapshot of the application data set, while in other embodiments, the disaster recovery manager may be configured to use an existing copy-on-write snapshot. In some embodiments, the disaster recovery manager may also be configured to generate a notification of the results of the disaster recovery rehearsal, for example by sending an e-mail to one or more users.

In one embodiment, the data set may be a replica data set of a primary data set of the application. The replica data set may be maintained at a secondary site, while the primary data set may be maintained at a primary site, which may be linked by an interconnect to the secondary site. The primary and secondary sites may be physically remote from one another. Any of a variety of replication techniques may be utilized to maintain the replica data set, including, for example, synchronous or asynchronous replication. In one embodiment, the disaster recovery manager may be configured to cooperate with a separate replication manager to perform the disaster recovery rehearsal, while in another embodiment, the disaster recovery manager may perform replication functions as well.

A disaster recovery rehearsal may be triggered using a variety of techniques. In one embodiment, disaster recovery rehearsals may be initiated according to an automated schedule. For example, in one such embodiment, the disaster recovery manager may be configured to perform a disaster recovery rehearsal once a day or once a week, without requiring any interaction with a user or administrator. In another embodiment, a disaster recovery rehearsal may be initiated in response to an administrative command, which may be provided for example using a command-line interface or using a graphical user interface (GUI) interaction such as a single click on an icon. Storage dedicated for the copy-on-write snapshot may be utilized in a number of different ways after the disaster recovery rehearsal completes, or between successive disaster recovery rehearsals. For example, in one embodiment, the copy-on-write snapshot may be utilized (possibly after a resynchronization) for offline analysis operations such as data mining or for backup. In some embodiments, after a disaster recovery rehearsal completes, at least a part of the storage dedicated for the COW snapshot may be re-used to store data for other applications.

In one specific embodiment, a system may include a primary site containing a first set of one or more storage devices containing a primary data set of an application, and a secondary site including a second and a third set of one or more storage devices, where the second set of storage devices contains a replica of the primary data set. The secondary site may be linked to the primary site by an interconnect. In addition, the system may include a disaster recovery manager configured to perform a disaster recovery rehearsal using a copy-on-write snapshot of the replica. At least a portion of the copy-on-write snapshot may be stored in the third set of one or more storage devices.

BRIEF DESCRIPTION OF THE DRAWINGS

FIG. 6 is a block diagram illustrating one embodiment of a computer-accessible medium.

Figure 1:
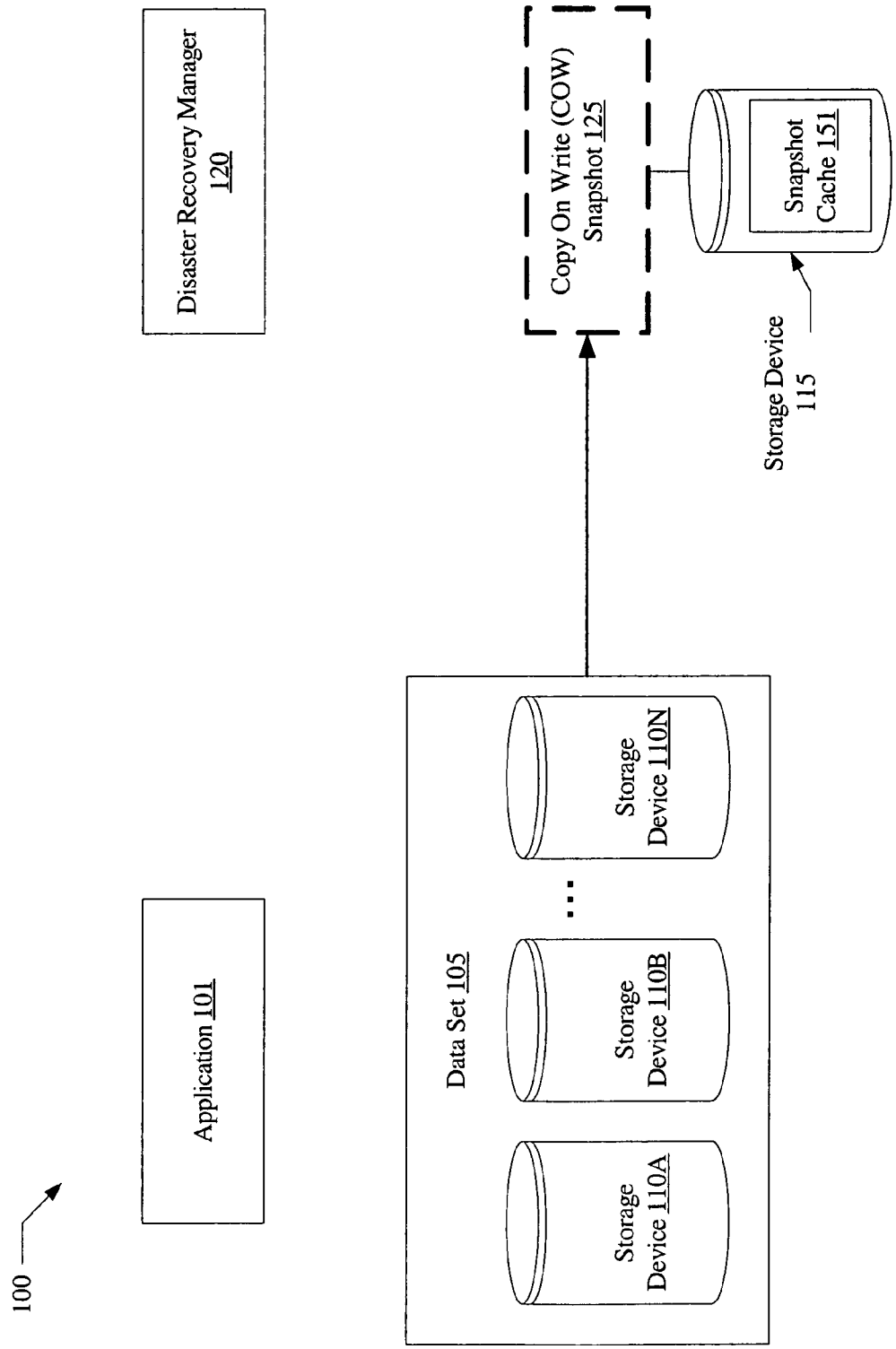
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a data set 105 of an application 101, and a disaster recovery manager 120. The term "data set of an application", as used herein, refers to a set of data that may be manipulated by the application to provide the functionality supported by the application, for example by performing input/output (I/O) (i.e., read and/or write operations) and computational operations. The format and organization of data within a data set 105, and the specific types of physical and/or logical storage devices on which the data set 105 may be stored, may vary in different embodiments and for different applications. For example, in one embodiment, a data set for a relational database management application may include a plurality of database tables, indexes, log files, configuration information and metadata, which may be stored in one or more hierarchically organized directories or folders of one or more file systems or logical volumes. In the embodiment depicted in FIG. 1, data set 105 is stored in one or more storage devices 110A, 110B ... 110N (which may collectively be referred to herein as storage devices 110). Storage devices 110 may include physical storage devices, logical storage devices, or a combination of physical and logical storage devices. Physical storage devices included within storage devices 110 may include, for example, disks, disk arrays, optical devices such as CD-ROMs, CD-RW drives, DVD-ROMs, and DVD-RW drives, tape devices, and any desired forms of volatile or non-volatile memory. Logical storage devices included within storage devices 110 may include, for example, disk partitions, logical volumes, file systems, directories, files, and the like.

Disaster recovery manager 120 may be configured to provide a number of different types of services to allow a graceful response to a sustained outage of application 101. In the embodiment shown in FIG. 1, for example, disaster recovery manager 120 is configured to perform a disaster recovery rehearsal using a copy-on-write (COW) snapshot 125 of data set 105. The use of a COW snapshot 125 instead of a full copy of data set 105 may result in a reduction in the storage requirements dedicated for disaster recovery rehearsals in some cases. Further details on how a COW snapshot 125 may be established and used, and the storage that may be dedicated specifically for COW snapshot 125 (such as storage within storage device 115 that may be used for a snapshot cache 151) are provided below. Disaster recovery rehearsals may be performed to increase confidence that disaster recovery plans would work in the event of an actual disaster. If an actual long-lasting outage of application 101 occurs, disaster recovery manager 120 may be configured to perform disaster recovery in accordance with the disaster recovery plans, for example by starting up a recovery version of application 101 to provide services provided by application 101 prior to the outage.

In addition to disaster recovery rehearsals and actual disaster recovery operations, a number of other disaster recovery-related functions may also be performed by disaster recovery manager 120. For example, in one embodiment, where application 101 is typically executed at a primary data site during normal operation, disaster recovery manager 120 may be configured to cooperate with a replication manager and/or a volume manager to ensure that a replica of data set 105 is maintained at a secondary site. In the event that application 101 can no longer continue to provide its functionality from the primary data site (for example, due to a sustained power outage, an earthquake, a fire, a terrorist attack, or some other disaster affecting the primary data site), a second copy of the application may be employed to provide desired services using the replica of the data set. In some embodiments, the functionality of maintaining a replica of the data set may be performed by disaster recovery manager 120 rather than by a separate replication manager. As described in further detail below in conjunction with the description of FIG. 3, disaster recovery rehearsals may be performed at the secondary site in such embodiments. In addition, in some specific embodiments, disaster recovery manager 120 may also be configured to ensure that a current copy of the executable code of the application (i.e. a copy that is consistent with the application running at the primary site), including application configuration information, is installed and ready to be executed at a secondary site in the event of a disaster at the primary site. Various other functions related to disaster recovery, such as providing periodic notifications to interested parties (such as disaster recovery staff members) indicating the state of disaster recovery readiness (such as an inventory of storage and processing resources that may be available for deployment during disaster recovery) may also be supported by disaster recovery manager 120 in different embodiments.

In the embodiment illustrated in FIG. 1, as noted above, disaster recovery manager 120 is configured to perform a disaster recovery rehearsal. A disaster recovery rehearsal may include one or more operations that may be performed to test a recovery version (or recovery copy) of an application before a disaster actually occurs. The disaster recovery rehearsal may be used to simulate, as closely as desired or permitted by resource constraints, conditions that may become prevalent if the primary version of the application becomes unavailable, in an attempt to gain confidence that recovery plans would succeed if a real outage were to occur at the primary application. A number of separate tests may be conducted during a disaster recovery rehearsal, including tests to start up a recovery version of the application, and tests to verify that the recovery version of the application can successfully perform I/O and computation operations on a data set, similar to the operations typically performed on data set 105 by the primary version of the application.

Many complex applications may require non-trivial configuration or setup steps, and may rely upon numerous software packages with frequently changing versions. As the data set 105 of the primary version of application 101 changes, various configuration changes may be made to the primary version, for example to allow larger data sets to be handled effectively and efficiently. In addition, newer versions of software packages may be deployed as the data set changes, without which the application may also be unable to perform desired functions on the changing data set, or provide a desired level of performance. In order to increase the likelihood that a recovery version of the application would be able to successfully take over the functionality of the primary version, it may therefore be desirable to exercise the recovery version with a data set that resembles a current data set 105 of the primary version of application 101 as closely as possible. In addition to being similar in size and content to the current data set of the primary version of the application, it may also be desired that a data set used for disaster recovery rehearsal be in an internally consistent state for correct operation (e.g., for a data set of a database management application, the data set should contain no uncommitted modified data). One approach that may be used is to dedicate a full replica of the entire contents of data set 105 to disaster recovery rehearsal. For example, a full copy of data set 105, matching the contents of the data set 105 as of a given point in time, may be used as a starting data set for a set of test scripts run during the disaster recovery rehearsal. During the disaster recovery rehearsal, the test scripts may result in updates being applied to the starting data set. However, for large data sets 105, which may, for example, take up multiple terabytes of storage, the cost of dedicating a full replica to disaster recovery rehearsal may become prohibitive. Instead, as in the embodiment depicted in FIG. 1, disaster recovery manager 120 may be configured to utilize a copy-on-write snapshot 125 of the data set 105 during disaster recovery rehearsal.

The term "snapshot" of a collection of data such as data set 105, as used herein, refers to an image of the collection of data as of a particular point in time. Snapshots may, in general, be created for many different kinds of logical and physical data objects. The collection of data whose snapshot is being created may be referred to herein as a "snapshot source". A snapshot source may include one or more logical volumes, one or more file systems, one or more physical storage devices such as individual disks, groups of disks, one or more disk arrays, or a combination of such physical and logical storage devices. Snapshots may be used in a variety of different storage applications, such as off-host backups, decision support and data mining, as well as for disaster recovery rehearsals, as described in further detail below.

A copy-on-write (COW) snapshot 125 of data set 105 may be established using a variety of techniques. A COW snapshot 125 is a logical entity that may use physical storage within one or more physical storage devices, as described below. In some embodiments, COW snapshot establishment and management may be provided by a software snapshot manager incorporated within disaster recovery software 120, while in other embodiments, a volume manager or some other software package may provide snapshot functionality, or snapshots may be managed using hardware techniques. In the following description, the term snapshot manager is used generically to refer to the entity providing snapshot functionality (e.g., the entity allowing snapshots to be created, handling I/O directed at the snapshot, etc.)

In general, a copy-on-write technique may be used to create snapshots more efficiently by making use of the fact that for most data objects, only a subset of the I/O operations performed are write operations, and for many storage applications, read operations are fairly frequent. In one embodiment deploying a COW snapshot 125 at the logical volume level, for example, the first time a data block of a snapshot source is to be written after a COW snapshot is established, the old data is first copied over to a persistent data storage area called a snapshot cache 151, and an indication that the data block has been updated is stored in one or more snapshot metadata structures (which may be maintained in either volatile or persistent storage) such as a map or a table. This operation may be termed a "COW push". The snapshot cache 151 and/or part or all of the snapshot metadata structures may be stored in a storage device such as storage device 115 in some embodiments. Subsequent writes directed at a COW-pushed block of the snapshot source occur normally. Reads to the snapshot source are not impacted by the snapshot creation. When a read request directed at the COW snapshot 125 is received, the snapshot metadata structures are checked to determine whether the target block of the read request has been updated since the creation of the COW snapshot 125. If the target block has been updated, the old data is read from the snapshot cache 151; otherwise, the target block is read from the snapshot source (as it has not been updated since the snapshot was created).

For some types of applications, such as backup or data mining, only read access to the COW snapshot 125 may be desired. However, in some embodiments, for other applications including certain types of disaster recovery rehearsals that may include updates, write access may be granted to a COW snapshot 125. In one embodiment, where writes are permitted on a COW snapshot 125, the snapshot manager may store updated blocks in the snapshot cache 151. If an update is directed at a block of the COW snapshot 125 that was previously COW pushed as a result of an update to the snapshot source, the COW-pushed version may be overwritten by the newly-updated version in snapshot cache 151 in some embodiments.

Figure 2A:
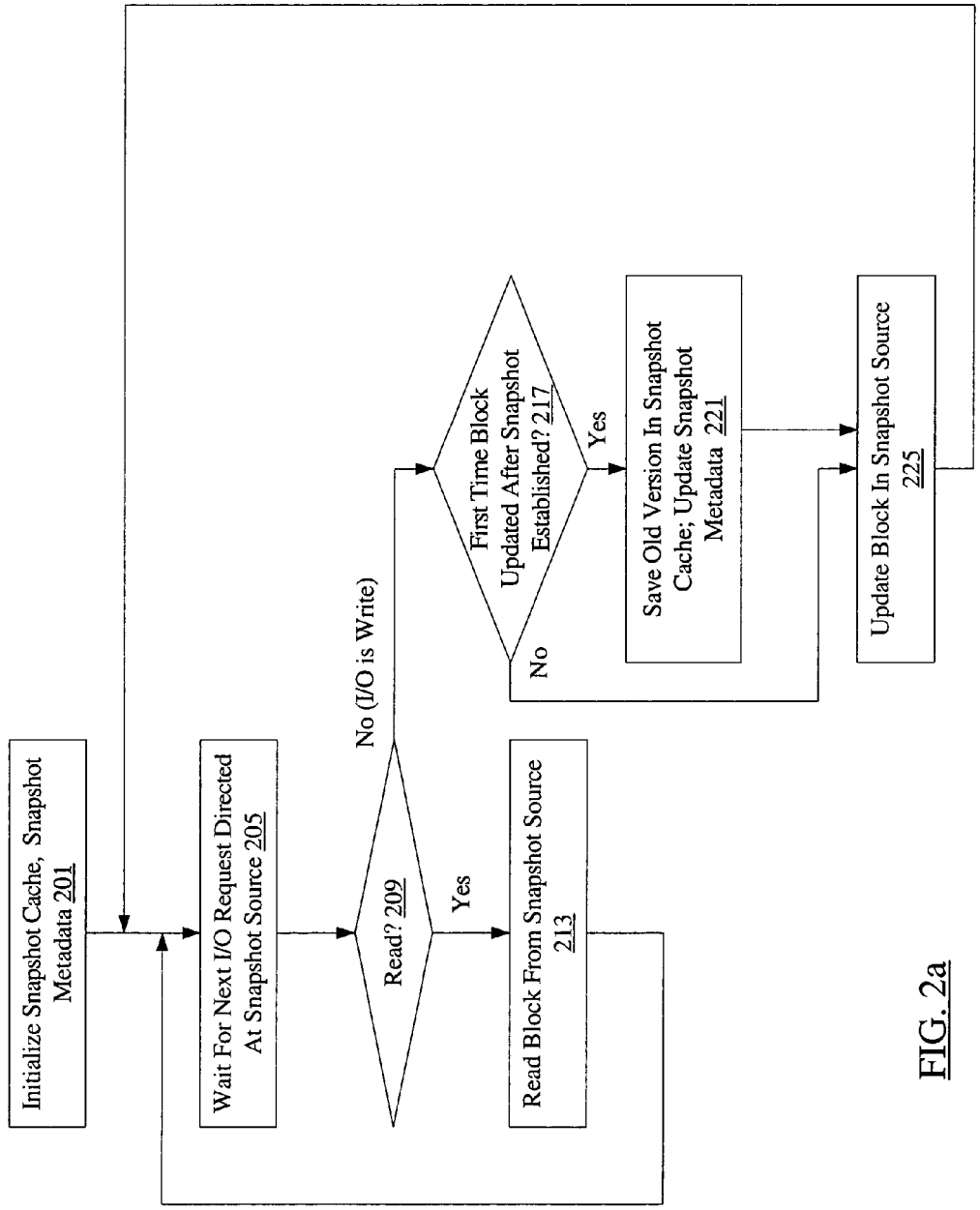
FIG. 2a and FIG. 2b are flow diagrams illustrating aspects of the operation of a snapshot manager during an establishment of a copy-on-write (COW) snapshot for a logical volume and during subsequent I/O operations, according to one embodiment.
Figure 2B:
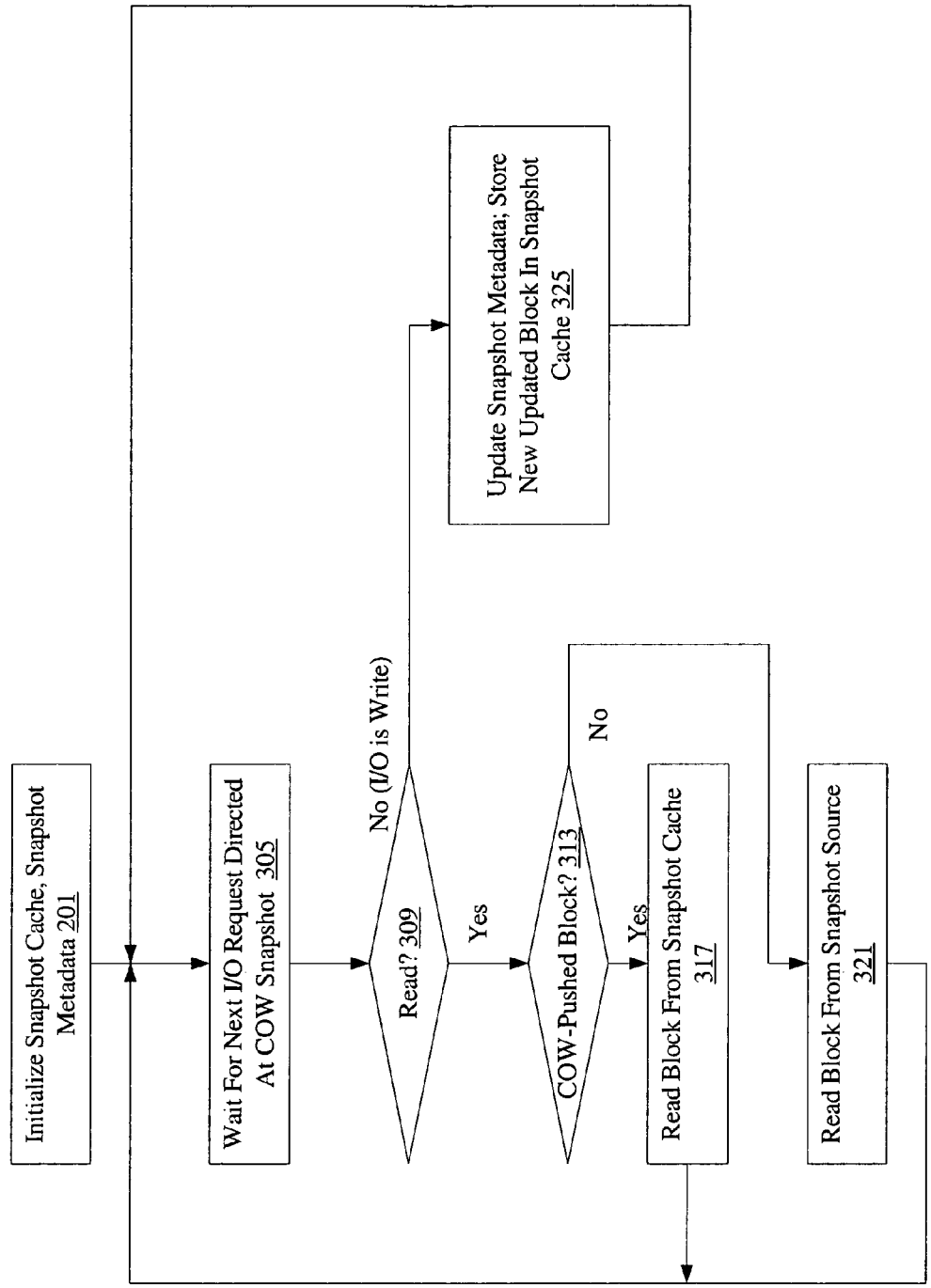

FIG. 2a and FIG. 2b are flow diagrams illustrating aspects of the operation of a snapshot manager during an establishment of a COW snapshot 125 for a logical volume (i.e., where the snapshot source is a logical volume) and during subsequent I/O operations, according to one embodiment. FIG. 2a illustrates steps that may be taken to respond to I/O operations targeted at the snapshot source, while FIG. 2b illustrates steps that may be taken to respond to I/O operations targeted at the COW snapshot 125. As shown in block 201, the COW snapshot 125 may be established by initializing a snapshot cache 151 and snapshot metadata structures. Initializing the snapshot cache 151 may include allocating persistent storage for the snapshot cache. The snapshot metadata may be included in the same persistent storage device used for snapshot cache 151 in some implementations. In one implementation, at least part of the snapshot metadata structures may be maintained in volatile memory. In some embodiments, a dedicated storage device 115 may be used to house the snapshot cache 151 and/or the snapshot metadata, while in other embodiments, a shared storage device 115 (i.e., a storage device used for other purposes in addition to housing the snapshot cache 151 or the snapshot metadata) may be utilized. It is noted that multiple physical and/or logical storage devices may be used to store the snapshot cache 151 and snapshot metadata in different embodiments. In addition, in some embodiments, only the COW-pushed data blocks may be stored on a separate storage device 115, while part or all of the snapshot metadata may be stored on the same storage devices 110 that are used by the snapshot source.

After the COW snapshot has been established, the snapshot manager may wait for the next I/O request directed at the snapshot source, as shown in block 205 of FIG. 2a. If the next I/O operation is a read (as detected in decision block 209), the requested block may be read from the snapshot source (block 213) and the snapshot manager may resume waiting for a next I/O (block 205). If the next I/O operation is a write, the snapshot manager may be configured to check whether the targeted block is being updated for the first time since the snapshot was established (decision block 217). If this is the first time the targeted block is being updated after the establishment of the COW snapshot, the snapshot manager may save the old version of the targeted data block in the snapshot cache 151, and update snapshot metadata to indicate the occurrence of the update at the targeted address (block 221 of FIG. 2a). The snapshot metadata may be implemented and updated using any of a variety of techniques in different embodiments, such as one or more hash tables, one or more lists of pointers, one or more bitmaps, or any combination of such structures. In some embodiments, additional information such as the time at which the update occurred, or a sequence number may also be stored within the snapshot metadata, and/or with the saved data block in the snapshot cache 151. In one embodiment, the snapshot metadata may be stored in a different location or data structure than the data blocks saved within the snapshot cache 151, while in other embodiments, the snapshot metadata and the data blocks may be co-located. After the snapshot metadata is updated, or if the write was not the first write directed at the targeted block, the targeted block may be updated in the snapshot source (block 225 of FIG. 2a).

As noted above, FIG. 2b illustrates steps that may be taken to respond to I/O operations targeted at the COW snapshot 125 according to one embodiment. After the establishment of the COW snapshot (i.e., initialization of snapshot cache 151 and snapshot metadata structures, as shown in block 201), the snapshot manager may await the next I/O request directed at the COW snapshot 125 (block 305). If the next I/O operation is a read (as detected in decision block 309), the snapshot manager may be configured to detect whether the requested block is a COW-pushed block (i.e., a block that has been updated at the snapshot source since the establishment of the COW snapshot 125) (decision block 313). If the requested block is a COW-pushed block, the requested block may be read from the snapshot cache 151 (block 317 of FIG. 2b), otherwise the requested block may be read from the snapshot source (block 321). If the request is a write request, snapshot metadata may be updated reflecting an update to the targeted block, and the newly updated version of the updated block may be stored within the snapshot cache 151 (block 325 of FIG. 2b). If the target of the write request is a COW-pushed block, in one embodiment, the snapshot manager may be configured to overwrite the COW-pushed block. While FIGS. 2a and 2b describe embodiments where COW snapshots are created and managed for logical volumes, similar techniques may be employed to implement COW snapshots for any desired types of storage objects, such as file systems, collections of file systems or volumes, disk partitions, physical storage devices such as disks, disk arrays, or collections of disks or disk arrays, etc.

After a COW snapshot 125 has been used to perform desired operations such as a backup or a disaster recovery rehearsal, it may be desired to resynchronize the snapshot with the snapshot source. That is, the COW snapshot 125 may be logically updated with those data blocks of the snapshot source that have been modified since a previous synchronization, or that have been modified since a creation of the COW snapshot 125 if no previous resynchronization has taken place. Such a resynchronization may be performed, for example, simply by logically or physically deleting a portion of the snapshot metadata (e.g., by deleting pointers that may have pointed to COW-pushed blocks, or by zeroing out a bitmap indicating the addresses of COW-pushed blocks) in some implementations. Very limited physical I/O may be required, making the resynchronization a fairly rapid operation.

In embodiments employing COW snapshots using techniques such as those described above, the storage space dedicated to a COW snapshot 125 (such as space for a snapshot cache 151 and snapshot metadata within storage device 115) may be smaller than the storage required for the corresponding snapshot source such as data set 105. The term "space-optimized snapshots" may be used to refer to such snapshot implementations. Initially, a relatively small and largely empty snapshot cache 151 may be allocated for the COW snapshot. The space required for the snapshot cache 151 and snapshot metadata may grow over time, for example as updates to the snapshot source and/or updates to the snapshot occur, but may still not approach the size of the snapshot source for many applications and for most periods over which the COW snapshot 125 may be utilized. For the purposes of disaster recovery rehearsals for applications with large data sets 105, therefore, the use of COW snapshots 125 may provide significant cost savings, relative to the use of a full copy of a data set specifically for disaster recovery rehearsals. In some embodiments, in order to accommodate growth in storage requirements, the COW snapshot 125 may be configured with an "auto-grow" feature, allowing additional storage to be allocated for the snapshot cache 151 and/or snapshot metadata as needed. For example, in some implementations, additional storage may be allocated for use by the COW snapshot 125 in user-specified units (e.g., in 1 gigabyte increments), or additional storage increments may be specified in relative terms such as percentage increases (e.g., when the space used for the COW snapshot 125 reaches 75% of its current allocation, 50% additional space may be allocated). In some embodiments, the initial amount of storage dedicated for snapshot cache 151 and/or snapshot metadata may be selected by an administrator or other user based on heuristics that may be derived from expected update rates at the snapshot source as well as expected update rates for applications accessing the COW snapshot (e.g., based on a knowledge of details of the disaster recovery rehearsal tests, such as an expected duration and an expected update rate).

It is noted that copy-on-write snapshots may also be implemented using techniques other than those described above. For example, in one embodiment, an amount of storage equal in size to the snapshot source, which may be termed a COW replica area, may be set aside for potential use during the lifetime of the COW snapshot 125. Subsequent reads and writes may be handled in a manner similar to that described above in conjunction with the description of FIGS. 2*a* and 2*b*: e.g., prior to updating a data block of the snapshot source for the first time, a copy of the data block being targeted for an update may be copied to the COW replica area, etc. It is noted that disaster recovery rehearsals may be performed using COW snapshots established using any desired type of software and/or hardware COW implementation.

Figure 3:
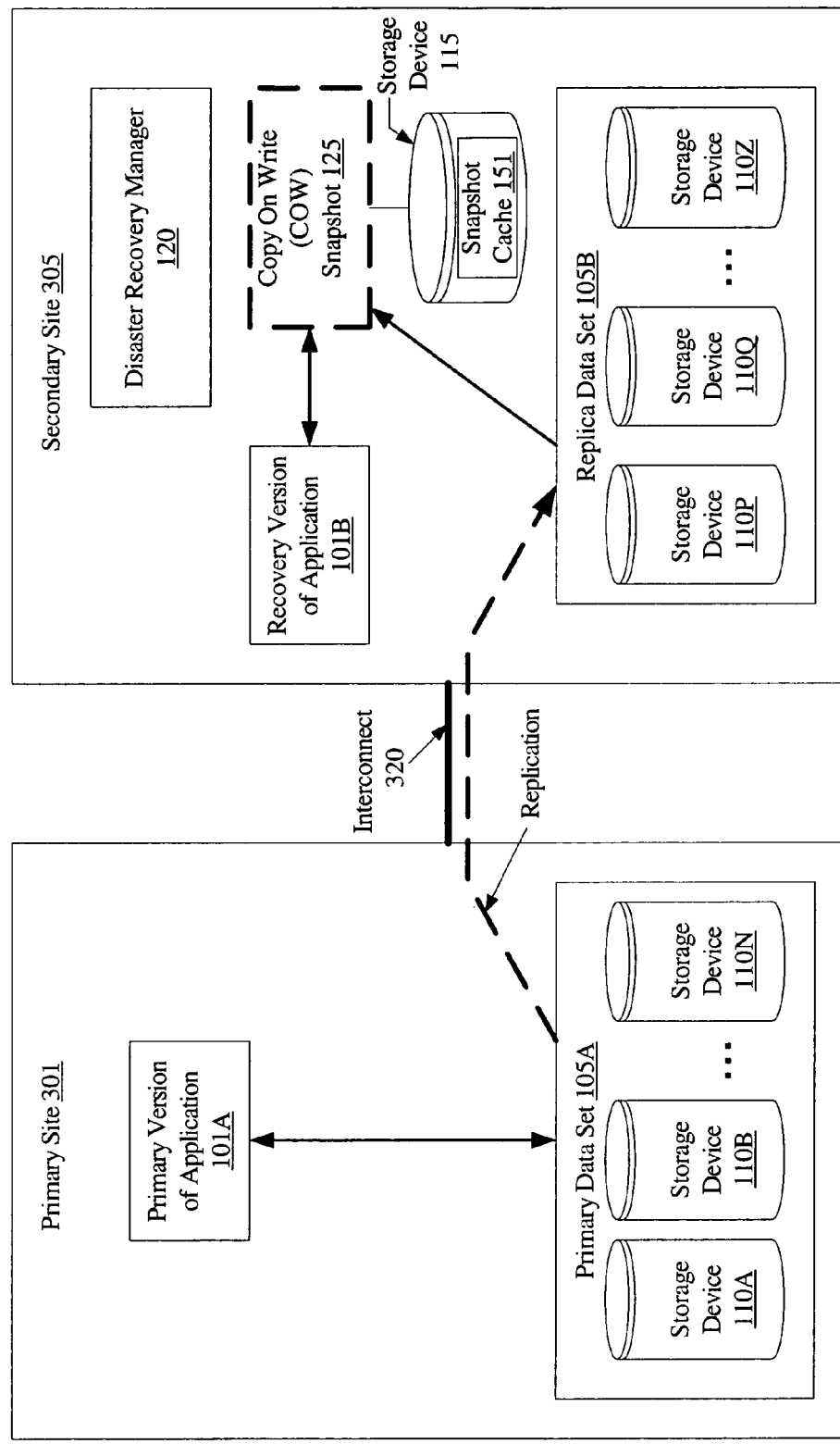
FIG. 3 is a block diagram illustrating an embodiment where a primary version of an application runs at a primary site and manipulates a primary data set, while a replica data set corresponding to the primary data set is maintained at a secondary site.

As noted earlier, in some embodiments, disaster recovery manager 120 may be configured to perform a disaster recovery rehearsal at a secondary site. FIG. 3 is a block diagram illustrating one such embodiment, where a primary version of an application 101A runs at a primary site 301 and manipulates primary data set 105A, while a replica data set 105B corresponding to the primary data set 105A is maintained at a secondary site 305. Primary data site 301 and secondary data site 305 may be linked by an interconnect 320, and may be housed at physically remote locations (e.g., at locations that may be in separate offices, separate buildings, separate towns or even separate countries or continents). Disaster recovery software 120 may be configured to perform a disaster recovery rehearsal using a COW snapshot 125 of the replica data set 105B at secondary site 305. While disaster recovery rehearsal is in progress, updates made to the primary data set 105A by the primary version 101A of the application may continue to be replicated at the replica data set 105B using one of the replication techniques described in further detail below. Primary data set 105A may be stored on one or more storage devices 110A-110N, while replica data set 105B may be stored on storage devices 110P-110Z. During a disaster recovery rehearsal, a recovery version 101B of the application and/or disaster recovery manager 120 may perform I/O operations on the COW snapshot 125. In one embodiment, the techniques described earlier for establishing and maintaining space-optimized COW snapshots may be utilized for COW snapshot 125 at secondary site 305, thereby reducing the amount of storage (e.g., within storage device 115) that may be needed for the COW snapshot 125. It is noted that while disaster recovery manager 120 is illustrated within secondary site 305, one or more portions or modules of disaster recovery manager 120 may also be incorporated at primary site 301. Such a module at primary site 301 may be utilized, for example, to provide status information on the primary version 101A of the application or primary site 301, to other modules of disaster recovery manager 120.

Any desired replication technique may be utilized to maintain replica data set 105B. In some embodiments, for example, synchronous replication may be employed: e.g., before any data block of primary data set 105A is updated, a copy of the updated version of the data block may be saved in replica data set 105B. In other embodiments, asynchronous replication may be employed, where the replica data set 105B may lag behind in reflecting updates being made to the primary data set 105A. The delay in reflecting updates may be configurable in some embodiments; i.e., an administrator may be provided the ability to specify a maximum acceptable replication delay, such that a given updated block at primary site 105A may be copied to replica data set 105B with a delay less than the specified acceptable replication delay. As noted earlier, the functionality of maintaining replica data set 105B may be incorporated within disaster recovery manager 120 in some embodiments, while in other embodiments, a replication manager or a volume manager distinct from disaster recovery manager 120 may be used to maintain replica data set 105B. A high speed interconnect 320 may be dedicated for synchronous replication in some embodiments. It is noted that in one specific embodiment, an additional copy of the primary data set 105A may also be maintained at primary site 301A itself, for example as a local backup or mirror. Any desired hardware and/or software communication technology or protocol may be used for interconnect 320, including, for example, the Transmission Control Protocol/Internet Protocol (TCP/IP) over the Internet.

Disaster recovery manager 120 may be configured to verify the availability or status of primary site 301 and primary version 101A of the application periodically in some embodiments. For example, in one embodiment, disaster recovery manager 120 at secondary site 305 may be configured to periodically exchange "heartbeat" messages with the primary version 101A of the application (or with a module of disaster recovery manager 120 that may be incorporated at primary site 301), allowing the disaster recovery manager 120 to monitor the health of the primary version of the application 101A. If, in such an embodiment, the primary version of the application fails to send an expected heartbeat message or an expected sequence of heartbeat messages within a specified time interval, disaster recovery manager 120 may be configured to deduce that the primary version 101A of the application has failed. Disaster recovery manager 120 may be configured to start disaster recovery operations if no indication is received that the primary version 101A of the application has become operational within a designated time window after a failure detection in one embodiment. In other embodiments, a cluster manager or other software may be used by disaster recovery manager 120 to determine the status of the primary version 101A of the application. Disaster recovery may also be initiated manually at secondary site 305 in some embodiments. In one embodiment, disaster recovery manager 120 and/or a cluster manager may be configured to ensure that a disaster recovery rehearsal does not interfere with an actual disaster recovery operation. For example, in such an embodiment, if a disaster recovery rehearsal is in progress when a missed heartbeat is detected, the disaster recovery rehearsal may be stopped before a failover or recovery version of the application is started in response to the missed heartbeat.

A disaster recovery rehearsal may be triggered using a number of different techniques. In some embodiments, a disaster recovery rehearsal may be initiated based on an automated schedule: for example, a disaster recovery rehearsal may be performed once a day, once a week, once a month, etc. No interaction may be required from a system administrator or other user to start a disaster recovery rehearsal in such embodiments. Any of various scheduling tools, such as the "cron" facility provided in many UNIX-related operating systems, or the "Windows Scheduler" facility available in some versions of Microsoft Windows™ may be used to automate the scheduling of a disaster recovery rehearsal. In some embodiments, disaster recovery manager 120 may include an embedded scheduling facility that may be used for scheduling disaster recovery rehearsals instead of relying on external scheduling tools. In other embodiments, a disaster recovery rehearsal may be initiated in response to an administrative command, which may be provided, for example, through a command-line interface or through a graphical user interface (GUI). A single command or GUI interaction (such as a click on an icon) may be used to initiate disaster recovery rehearsal in some embodiments, to minimize the effort required on the part of an administrator or user. The establishment of COW snapshot 125 (using any desired COW implementation technique such as the techniques described earlier) may be included among the operations performed as part of a disaster recovery rehearsal in some embodiments. In other embodiments, COW snapshot 125 may be created independently of the disaster recovery rehearsal, for example to accomplish other functions such as off-host backup, and disaster recovery software 120 may be configured to take advantage of an existing COW snapshot to perform the rehearsal.

Figure 4:
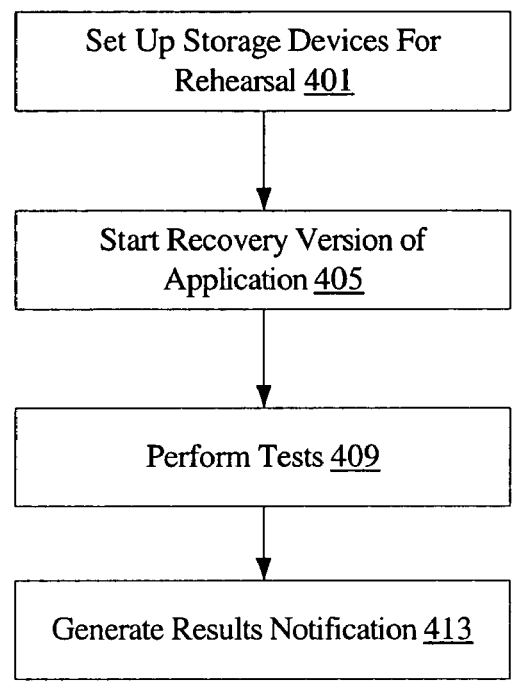
FIG. 4 is a flow diagram illustrating aspects of the operation of a disaster recovery manager during a disaster recovery rehearsal, according to one embodiment.

FIG. 4 is a flow diagram illustrating aspects of the operation of disaster recovery manager 120 during a disaster recovery rehearsal, according to one embodiment. A recovery version 101B of the application may require access to a number of different storage devices such as disk groups and volumes, some of which may be used to store the snapshot cache 151 and/or snapshot metadata. As shown in block 401 of FIG. 4, disaster recovery manager 120 may set up or configure one or more storage devices for use during the remaining steps of the disaster recovery rehearsal. As noted above, disaster recovery manager 120 may initiate the establishment of the COW snapshot 125 during this setup step in some embodiments, for example by setting up a snapshot cache 151 and initializing snapshot metadata structures. After the desired storage devices have been set up, disaster recovery manager may be configured to start recovery version 101B of the application (step 405). As also noted earlier, disaster recovery manager 120 may be configured to ensure that a current version of the application is installed for use during the disaster recovery rehearsal, prior to the start of the disaster recovery rehearsal. The installation of complex application software may sometimes take hours and extensive expertise, and therefore may typically not be included in the set of steps to be performed during a disaster recovery rehearsal (or during actual recovery after a disaster). It is also noted that the installation of the application is a requirement for disaster recovery, not just for disaster recovery rehearsals, so storage space used for the application installation may not be considered to be storage dedicated to disaster recovery rehearsals.

Once the recovery version 101B has been successfully started and has access to COW snapshot 125, a set of tests may be performed to verify correct operation of the recovery version 101B (block 409). In some embodiments, a disaster recovery rehearsal may include only read operations, while in other embodiments, both read and write operations may be performed during a disaster recovery rehearsal. For example, if application 101 is a database application, one or more rows of a database table may be read and/or written, and/or a specified set of queries may be executed. The correctness of the test results may be verified automatically in some embodiments (e.g., by comparing the results of a query with known expected results previously obtained from the primary version 101A of the application), and manually (e.g., by an administrator inspecting the test operations and test results) in other embodiments. In one embodiment, after the tests complete, disaster recovery manager 120 may be configured to generate a notification of results of the disaster recovery rehearsal (block 413). Such a notification may, for example, include results obtained during the tests, and may also contain log entries from various software modules (e.g., a cluster manager, a volume manager and/or various operating system services or daemons such as error loggers) that may have been generated during the time that the disaster recovery rehearsal was in progress. In some embodiments, the notification may be sent to one or more interested or subscribed parties such as disaster recovery staff members via e-mail, while in other embodiments, the notification may itself be logged in a disaster recovery rehearsal log file.

As noted earlier, one of the advantages of using a COW snapshot 125 to perform disaster recovery rehearsals is that a relatively small amount of storage space may have to be dedicated to the rehearsals (i.e., to store a snapshot cache 151 and/or snapshot metadata), compared to the amount of storage required for the primary data set 105A or the replica data set 105B. In some embodiments, disaster recovery manager may be configurable to limit the total amount of storage used during disaster recovery rehearsal. Users and/or administrators may select a maximum amount of storage they wish to dedicate to disaster recovery rehearsals, and configure disaster recovery manager 120 to perform a "best effort" disaster recovery rehearsal given the amount of dedicated storage available. For example, a desired maximum amount of storage (e.g., a gigabyte) may be set aside for a snapshot cache 151 and associated snapshot metadata of COW snapshot 125 in one embodiment. If, during a disaster recovery rehearsal, the storage previously set aside becomes fully utilized, in one embodiment, disaster recovery manager 120 may be configured to terminate the disaster recovery rehearsal, saving off any results obtained prior to the termination. In other embodiments, disaster recovery manager 120 may be configured to provide suggested sizes of storage that should be dedicated to disaster recovery rehearsals, for example based on trends detected during earlier disaster recovery rehearsals. Using such information, disaster recovery administrators may freely choose the amount of storage they wish to dedicate to disaster recovery rehearsal based on the tradeoff between the costs of storage and the benefits of longer and/or more thorough disaster recovery rehearsals.

Figure 5:
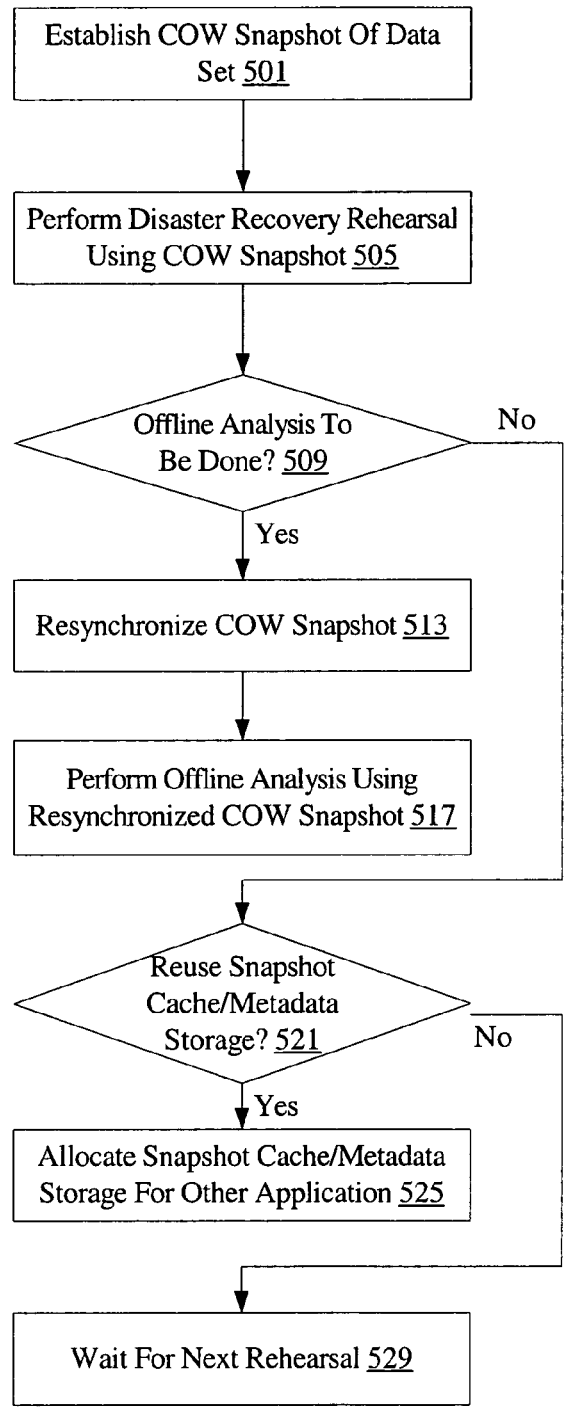
FIG. 5 is a flow diagram illustrating aspects of the operation of a secondary site according to one embodiment, where the storage utilized for a COW snapshot may be re-used when disaster recovery rehearsals are not in progress.

While the use of COW snapshots 125 for disaster recovery rehearsals as described above may generally result in storage cost savings, even the storage that is dedicated to disaster recovery rehearsals may be re-used for various purposes after a disaster recovery rehearsal completes, or between successive disaster recovery rehearsals. FIG. 5 is a flow diagram illustrating aspects of the operation of a secondary site 305 according to one embodiment, where at least part of the storage utilized for a COW snapshot 125 may be re-used when disaster recovery rehearsals are not in progress. A COW snapshot 125 may be established using storage within one or more storage devices 115 for a snapshot cache 151 and/or snapshot metadata, as described earlier (block 501). The COW snapshot 125 may then be utilized during disaster recovery rehearsal (block 505).

As noted earlier, in some embodiments, COW snapshots 125 may be resynchronized with their snapshot sources in an efficient manner, thereby re-establishing a new point-in-time image of the snapshot source (i.e., an image reflecting updates made at the snapshot source since the establishment of the COW snapshot). Such a point-in-time image may be utilized for functions such as data mining, decision support, report generation, backup, or other offline analysis and support functions in some embodiments. If, after a disaster recovery rehearsal illustrated in block 505 completes, it is detected that offline analysis or support operations may be required (decision block 509), the COW snapshot 125 may be resynchronized (block 513). The desired offline analysis or support operations may then be performed on the resynchronized COW snapshot (block 517). In some embodiments, where for example the disaster recovery rehearsal does not include write operations, or where it may be possible to undo writes performed during the disaster recovery rehearsal, the original point-in-time copy of the data set 105 (i.e., the COW snapshot 125 that was used for disaster recovery rehearsal) may be used for such offline analysis after the disaster recovery rehearsal is completed. Performance verification operations may also be performed using COW snapshot 125 after a disaster recovery rehearsal completes, or even during disaster recovery rehearsals, in some embodiments. For example, in such embodiments, it may be possible to use COW snapshot 125 at secondary site 305 to validate that new performance enhancement features of storage management software (e.g., a volume manager) have a net positive impact (or at least no negative impact) on performance, before deploying the new features at the primary site 301.

Alternatively, if no offline analysis or support operations are needed, but the storage used for snapshot cache 151 and/or snapshot metadata during the disaster recovery rehearsal may be re-used to store data for other applications (e.g., applications that may be unrelated to disaster recovery or disaster recovery rehearsals) (decision block 521), the storage may be allocated for use by such other applications (block 525). If no such alternative use for the storage used for snapshot cache 151 and/or snapshot metadata is desired, the storage may remain unused awaiting the next disaster recovery rehearsal (block 529). It is noted that if the storage used for snapshot cache 151 and/or snapshot metadata during disaster recovery rehearsals is utilized for other purposes between successive disaster recovery rehearsals, certain steps to set up storage devices (such as establishing or importing logical storage devices such as disk groups or logical volumes for the snapshot cache 151 and/or snapshot metadata) may have to be performed again for the next disaster recovery rehearsal.

It is noted that while only a single application 101 has been described in the foregoing, disaster recovery manager 120 may be configured to provide disaster recovery rehearsals for a plurality of applications in some embodiments, using techniques similar to those described above. Such disaster recovery rehearsals may include exercising all the applications at the same time in one embodiment, while subsets of the applications may be exercised in sequence in other embodiments. In some embodiments, disaster recovery manager 120 may be configured to perform multiple concurrent disaster recovery rehearsals, with each rehearsal corresponding to a respective application and a respective COW snapshot of the application's data set.

FIG. 6 is a block diagram illustrating a computer-accessible medium 600 comprising disaster recovery software 1010 capable of providing the functionality of disaster recovery manager 120 as described above. Disaster recovery software 600 may be provided to a computer system using a variety of computer-accessible media including electronic media (e.g., flash memory), magnetic media such as RAM (e.g., SDRAM, RDRAM, SRAM, etc.), optical storage media such as CD-ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a processor; and
    a computer accessible storage memory coupled to the processor, wherein the memory stores a data set of an application, wherein the data set is a replica data set of a primary data set of the application;
    wherein the memory also stores a disaster recovery manager;
    wherein the disaster recovery manager is configured to perform a disaster recovery rehearsal using a copy-on-write snapshot of the data set of the application;
    wherein, during the disaster recovery rehearsal, updates made to the primary data set are replicated at the replica data set; and
    wherein the disaster recovery rehearsal is initiated based on an automated schedule.

2. The system as recited in claim 1, wherein the replica data set is maintained at a secondary site, and the primary data set is maintained at a primary site.

3. The system as recited in claim 1, further comprising a physical storage device, wherein at least a portion of the copy-on-write snapshot is stored on the physical storage device, and wherein, after a completion of the disaster recovery rehearsal, the physical storage device is used to store data for another application.

4. The system as recited in claim 1, further comprising a physical storage device, wherein at least a portion of the copy-on-write snapshot is stored on the physical storage device, and wherein, upon a completion of the disaster recovery rehearsal, the physical storage device is used for one or more off-line analysis operations on the data set.

5. The system as recited in claim 1, wherein, upon a completion of the disaster recovery rehearsal, the disaster recovery manager is configured to generate a notification of results of the disaster recovery rehearsal.

6. A method, comprising:
    creating a copy-on-write snapshot of a data set of an application, wherein the data set is a replica data set of a primary data set of the application;
    performing a disaster recovery rehearsal using the copy-on-write snapshot; and
    during the disaster recovery rehearsal, replicating changes made to the primary data set to the replica data set;
    wherein the disaster recovery rehearsal is initiated based on an automated schedule.

7. The method as recited in claim 6, wherein the replica data set is maintained at a secondary site, and the primary data set is maintained at a primary site.

8. A computer accessible storage medium storing program instructions, wherein the instructions are executable to:
    create a copy-on-write snapshot of a data set of an application, wherein the data set is a replica data set of a primary data set of the application;
    perform a disaster recovery rehearsal using the copy-on-write snapshot; and
    during the disaster recovery rehearsal, replicate changes made to the primary data set to the replica data set;

wherein the disaster recovery rehearsal is initiated based on an automated schedule.

9. The computer accessible storage medium as recited in claim 8, wherein the replica data set is maintained at a secondary site, and the primary data set is maintained at a primary site.

10. A system comprising:
a processor; and
a computer accessible storage memory coupled to the processor, wherein the memory stores a data set of an application, wherein the data set is a replica data set of a primary data set of the application;
wherein the memory also stores a disaster recovery manager;
wherein the disaster recovery manager is configured to perform a disaster recovery rehearsal using a copy-on-write snapshot of the data set of the application;
wherein, during the disaster recovery rehearsal, updates made to the primary data set are replicated at the replica data set; and
wherein the disaster recovery rehearsal comprises one or more operations to set up storage devices used by a recovery version of the application.

11. A system comprising:
a processor; and
a computer accessible storage memory coupled to the processor, wherein the memory stores a data set of an application, wherein the data set is a replica data set of a primary data set of the application;
wherein the memory also stores a disaster recovery manager;
wherein the disaster recovery manager is configured to perform a disaster recovery rehearsal using a copy-on-write snapshot of the data set of the application;
wherein, during the disaster recovery rehearsal, updates made to the primary data set are replicated at the replica data set; and
wherein the disaster recovery rehearsal comprises one or more operations to start a recovery version of the application.

12. A system comprising:
a processor; and
a computer accessible storage memory coupled to the processor, wherein the memory stores a data set of an application, wherein the data set is a replica data set of a primary data set of the application;
wherein the memory also stores a disaster recovery manager;
wherein the disaster recovery manager is configured to perform a disaster recovery rehearsal using a copy-on-write snapshot of the data set of the application;
wherein, during the disaster recovery rehearsal, updates made to the primary data set are replicated at the replica data set; and
wherein the disaster recovery rehearsal comprises an execution of one or more tests to verify correct operation of a recovery version of the application.

13. A system comprising:
a processor;
a computer accessible storage memory coupled to the processor, wherein the memory stores a data set of an application, wherein the data set is a replica data set of a primary data set of the application;
wherein the memory also stores a disaster recovery manager;
wherein the disaster recovery manager is configured to perform a disaster recovery rehearsal using a copy-on-write snapshot of the data set of the application;
wherein, during the disaster recovery rehearsal, updates made to the primary data set are replicated at the replica data set; and
a physical storage device, wherein at least a portion of the copy-on-write snapshot is stored on the physical storage device, and wherein, after a completion of the disaster recovery rehearsal, the physical storage device is used to store data for another application.

14. A system comprising:
a processor;
a computer accessible storage memory coupled to the processor, wherein the memory stores a data set of an application, wherein the data set is a replica data set of a primary data set of the application;
wherein the memory also stores a disaster recovery manager;
wherein the disaster recovery manager is configured to perform a disaster recovery rehearsal using a copy-on-write snapshot of the data set of the application; and
wherein, during the disaster recovery rehearsal, updates made to the primary data set are replicated at the replica data set; and
a physical storage device, wherein at least a portion of the copy-on-write snapshot is stored on the physical storage device, and wherein, upon a completion of the disaster recovery rehearsal, the physical storage device is used for one or more off-line analysis operations on the data set.

15. A system comprising:
a processor; and
a computer accessible storage memory coupled to the processor, wherein the memory stores a data set of an application, wherein the data set is a replica data set of a primary data set of the application;
wherein the memory also stores a disaster recovery manager;
wherein the disaster recovery manager is configured to perform a disaster recovery rehearsal using a copy-on-write snapshot of the data set of the application;
wherein, during the disaster recovery rehearsal, updates made to the primary data set are replicated at the replica data set; and
wherein, upon a completion of the disaster recovery rehearsal, the disaster recovery manager is configured to generate a notification of results of the disaster recovery rehearsal.

16. A method, comprising:
creating a copy-on-write snapshot of a data set of an application, wherein the data set is a replica data set of a primary data set of the application;
performing a disaster recovery rehearsal using the copy-on-write snapshot;
during the disaster recovery rehearsal, replicating changes made to the primary data set to the replica data set;
wherein at least a portion of the copy-on-write snapshot is stored on a physical storage device; and
storing data for another application on the physical storage device upon a completion of the disaster recovery rehearsal.

17. A method, comprising:
creating a copy-on-write snapshot of a data set of an application, wherein the data set is a replica data set of a primary data set of the application;

performing a disaster recovery rehearsal using the copy-on-write snapshot;
during the disaster recovery rehearsal, replicating changes made to the primary data set to the replica data set;
wherein at least a portion of the copy-on-write snapshot is stored on a physical storage device; and
performing one or more offline analysis operations on the data set using the physical storage device upon a completion of the disaster recovery rehearsal.

* * * * *